(12) United States Patent
Bezet

(10) Patent No.: US 6,564,676 B2
(45) Date of Patent: May 20, 2003

(54) CYCLE PEDAL WITH IMPROVED ADJUSTABLE POSITIONING

(75) Inventor: Nicolas Jean-Guy Bezet, Nevers (FR)

(73) Assignee: Look Cycle International, Nevers (FR)

( * ) Notice: Subject to any disclaimer, the term of this patent is extended or adjusted under 35 U.S.C. 154(b) by 0 days.

(21) Appl. No.: 09/897,444

(22) Filed: Jul. 3, 2001

(65) Prior Publication Data

US 2002/0002876 A1 Jan. 10, 2002

(30) Foreign Application Priority Data

Jul. 4, 2000 (FR) .......................................... 00 08659

(51) Int. Cl.⁷ ................................................. G05G 1/14
(52) U.S. Cl. ..................................................... 74/594.7
(58) Field of Search ............................. 74/594.6, 594.4; 36/130, 131

(56) References Cited

U.S. PATENT DOCUMENTS

| 4,599,915 A |   | 7/1986 | Hlavac |
| 5,199,324 A | * | 4/1993 | Sain ............................. 36/131 |
| 5,860,330 A | * | 1/1999 | Code et al. .................... 36/131 |
| 6,241,639 B1 | * | 6/2001 | Hervig ....................... 74/594.4 |
| 6,393,940 B1 | * | 5/2002 | Ueda .......................... 74/594.4 |

FOREIGN PATENT DOCUMENTS

| EP | 0 058 438 | 8/1982 |
| WO | WO 96/00679 | 1/1996 |

* cited by examiner

*Primary Examiner*—David A. Bucci
*Assistant Examiner*—Bradley J. Van Pelt
(74) *Attorney, Agent, or Firm*—Young & Thompson

(57) ABSTRACT

A pedal includes a pedal body (1) carrying engagement members (2, 3) of a hooking element fixed below a cyclist's shoe, as well as a casing (7) containing a pedal axle (8) adapted to be fixed to a pedal crank. The casing is connected to the pedal body by a support member (10) including adjustment elements (10, 12, 20, 21) of the transverse position and the angular position of the pedal body relative to the pedal axle. For adjusting the angular position, the adjustment elements comprise a set of interchangeable support members each defining a predetermined different angular position from one support member to the other. The support member comprises an elongated seat (12) receiving the casing of the pedal axle and this seat is provided with a tapping (21) adapted to coact with a screw thread (20) on said casing to permit the continuous adjustment of the transverse position of the latter.

11 Claims, 2 Drawing Sheets

CYCLE PEDAL WITH IMPROVED ADJUSTABLE POSITIONING

FIELD OF THE INVENTION

The invention relates to automatic pedals with adjustable positioning of the pedal on the pedal axle, and more particularly to pedals for street bicycles, but also pedals for all-terrain bicycles.

BACKGROUND OF THE INVENTION

A pedal of this type comprises a pedal body having members for actuating a hooking element fixed below the cyclist's shoe, and a pedal axle adapted to be fixed to a pedal crank.

There are known automatic pedals of this type permitting adjustment of the positioning of the bearing surface of the foot during pedaling. A first adjustment permits longitudinally adjusting along the axis of the pedal, the bearing surface of the foot on the pedal, relative to the pedal crank to bring the foot as close as possible to the latter without touching it or to move it away from the latter. A second adjustment permits modifying the angle of inclination of the pedal body relative to the axle of the pedal.

An automatic pedal permitting these adjustments is known from patent application FR 99 06274 of the applicant. The pedal body carries a socket forming a seat for a casing in which the pedal axle is disposed. For adjusting the transverse position of the axle, a circular rib on the casing is adapted to coact with one from among several circular grooves provided in the socket. These circular grooves are disposed one after another so as to define successive transverse positions of the axle relative to the pedal body. The distance between the two end grooves is about 10 mm, which thus defines the range of axial adjustment.

The adjustment of the angular position of the pedal axle relative to the pedal body is carried out with the help of two parallel curved ramps disposed on the lower surface of the pedal body, transversely to the latter, which coact with two parallel curved shoulders provided on the upper surface of the socket. By moving the socket along the ramps, the angle of inclination of the pedal axle can be modified. However, this adjustment of the angular position is limited to about 6°.

Although this adjustment device is generally satisfactory, it nevertheless has several drawbacks. Thus, the adjustment of the angular position cannot be carried out without influencing the transverse position of the axle and it is often necessary to carry out a supplemental adjustment of the transverse position. It is moreover difficult to obtain a well-defined angular position, which can lead to a position of the foot that is not ergonomic and as a result is troublesome. The adjustment of the angular position is limited to 6°, whilst it is sometimes desirable to have a greater range of the order of 7°, or even more. It must also be noted that the adjustment of the transverse position cannot be carried out continuously.

SUMMARY OF THE INVENTION

The invention has for its object to overcome these drawbacks by providing a pedal provided with adjustment means for the transverse position and the angular position of the pedal axle, permitting adjustment of the angular position without risk of error of angle, with a greater range of the angles, and a continuous adjustment of the transverse position. The adjustment means are moreover extremely simple and reliable.

The invention also has for its object to provide a pedal provided with a pedal body that is lightened in weight and particularly resistant to wear.

The invention has for its object an automatic cycle pedal comprising a pedal body having members for engaging a hooking element fixed below the cyclist's shoe, as well as a casing containing a pedal axle adapted to be fixed to a pedal crank, the casing being connected to the pedal body by a support member fixed to the latter and comprising adjustment means for the transverse position and the angular position of the pedal body relative to the pedal axle, characterized by the fact that for adjustment of said angular position, said adjustment means comprise a set of interchangeable support members each defining a predetermined different angular position of one support member to the other.

According to other characteristics of the invention:
said angular position changes according to a value of 1 to 2 degrees, from one support member to the following one;
said value is substantially 1.5 degrees;
the interchangeable support members are 4 to 6 in number, preferably 5.
said support member comprises an elongated seat receiving said casing of the pedal axle, and said seat is provided with a tapping adapted to coact with a screw thread on said casing to permit a continuous adjustment of the transverse position of the latter;
said support member is resiliently deformable and comprises a socket containing said seat, this socket being slotted over all its length and comprises on opposite sides of the slot a securement wing provided with a surface for bearing against the pedal body, the bearing surface of one of the wings forming, when the support member is in a detached condition, an angle slightly greater than 180° relative to the bearing surface of the other securement wing, to permit the gripping and ungripping of said casing in the socket by resilient deformation of the latter during securement of the support member on the pedal body;
the pedal body is of carbon and it is provided with at least one wear member adapted to come into contact with said hooking member of said shoe on the pedal;
a wear member comprises a wing encased in the upper surface of the pedal body;
the wear member is detachable;
a second wear member is provided in the form of a nose encased in an inner surface of a front engaging member.

BRIEF DESCRIPTION OF THE DRAWINGS

Other characteristics and advantages of the invention will become apparent from the following description of an embodiment of the invention, this description being given by way of example with reference to the accompanying drawings, in which.

DETAILED DESCRIPTION OF THE INVENTION

Figure 1:
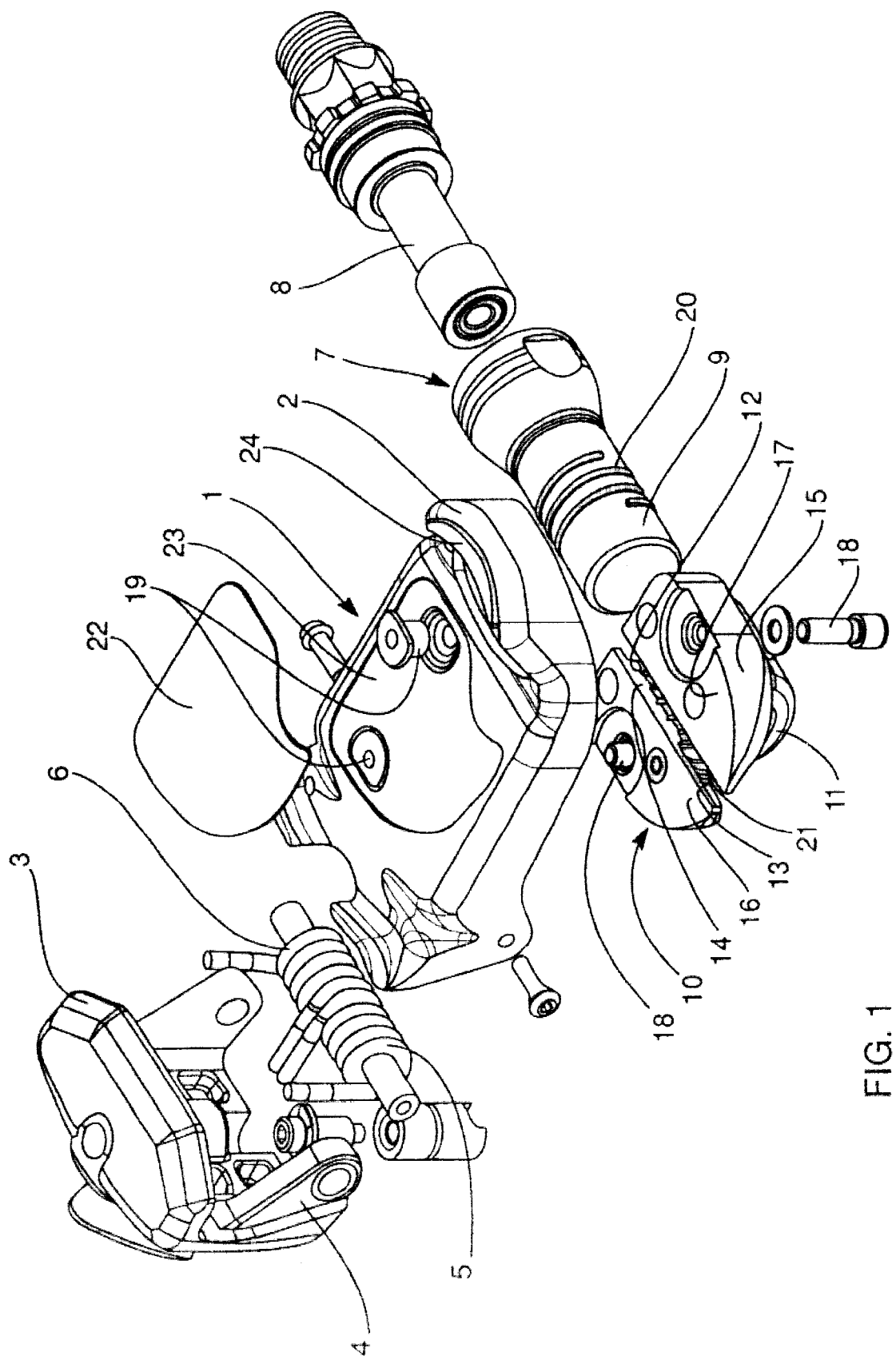
FIG. 1 is an exploded perspective view of a pedal according to the invention.

With reference to FIG. 1, the pedal comprises a pedal body 1 carrying engaging members of a hooking element (not shown) fixed below a cyclist's shoe (not shown). These engaging members comprise in known manner a front fixed hook 2 and a rear movable hook 3 formed on a lever 4 urged toward the engaging position by resilient elements constituted by torsion springs 5, 6.

The pedal body moreover carries an elongated element in the form of a casing 7 in which a pedal axle 8 is rotatably mounted with the help of a roller bearing (not shown).

Figure 2:
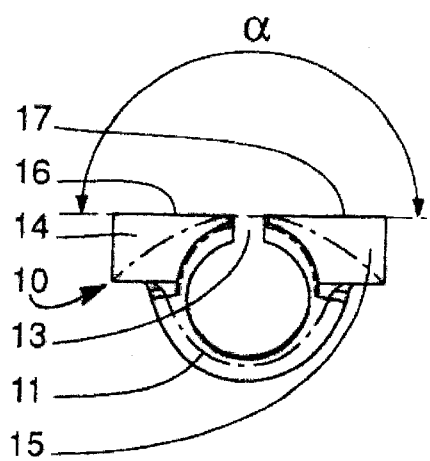
FIG. 2 is an end view of a support member according to the invention.

The casing 7 has a tail 9 carried by a support member 10 comprising a slotted socket 11 (see FIG. 2). The casing is more precisely disposed in a seat 12 formed by this socket which is made of a resilient material, preferably a plastic material. The socket is slotted over all its length and comprises on each side of the slot 13 a securement wing 14, respectively 15 having a respective bearing surface 16, 17 against the pedal body. The support member 10 is fixed to the pedal body 1 with the help of a screw 18 and a nut 19 passing through the bearing surface 16 respectively 17.

To adjust the transverse position of the pedal body 1, and accordingly the bearing surface of the foot, along the pedal axle 8, the casing 7 is provided with a screw thread 20 adapted to coact with a tapping 21 provided on the wall of the seat 12 in the socket 11.

Thanks to this arrangement, it is possible to obtain a continuous adjustment of this transverse position of the pedal body. The pitch of the screw is such that it gives a range of adjustment corresponding preferably to about 10 mm, permitting an adjustable positioning of 50 to 60 mm from the median longitudinal axis of the body of the pedal to the external surface of the crank.

So as to facilitate this adjustment by screwing and unscrewing the casing 7 in the seat 12 of the socket 11, the bearing surface 16 of one of the wings 14 forms, when at least one of the wings 14, 15 of the support member 10 is detached from the pedal body 1, an angle a slightly greater than 180° and preferably of 181° relative to the bearing surface 17 of the other wing 15.

The resilient return deformation of the support member 10 toward its unstressed position has the effect that the detached bearing surface 16 or 17 spaces itself from the pedal body 1 and the screwing and unscrewing can easily be carried out, and it suffices for this to unscrew one of the securement screws 18 to carry out this adjustment, but this arrangement also has the advantage that the casing is firmly gripped and blocked within the seat when the fixation screws are screwed in. There is thereby avoided any accidental displacement of the pedal body 1 relative to the axle 8 during pedaling.

The adjustment of the angular position of the pedal body 1 relative to the pedal axle 8 is obtained with a set of interchangeable support members each defining a predetermined different angular position from one support member to the next.

The set of support members preferably comprises five pieces as is shown in FIG. 3. FIG. 3C shows a neutral position in which the axis A—A of the seat 12 forms an angle β of 90° relative to a line B—B perpendicular to the bearing surface 16 or 17 of the support member.

Figure 3A:
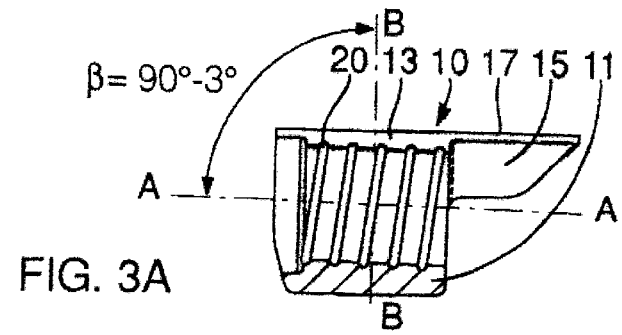
FIGS. 3A to 3E are views in longitudinal cross-section of support members according to the invention each having a different inclination of the seat of the casing of the pedal axle.
Figure 3B:
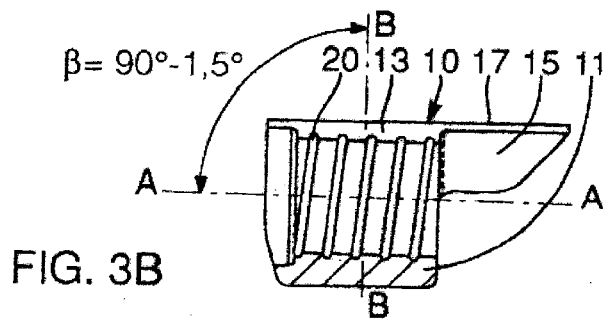
Figure 3C:
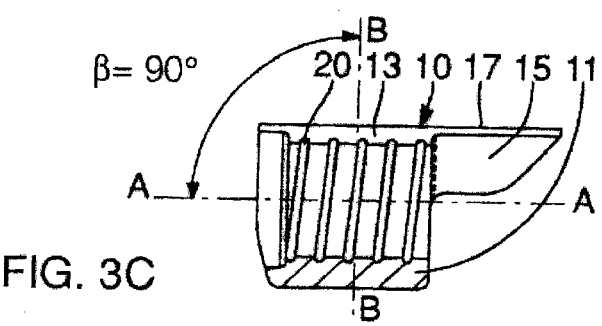

FIGS. 3A and 3B show upward inclinations of the pedal body. In FIG. 3B, the angle β corresponds to 90°+1.5° and in FIG. 3, this angle corresponds to 90°+3.0°.

Figure 3D:
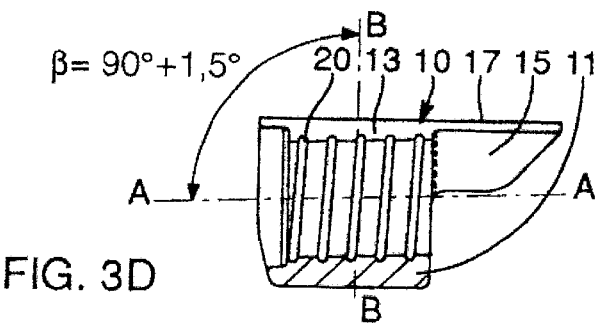
Figure 3E:
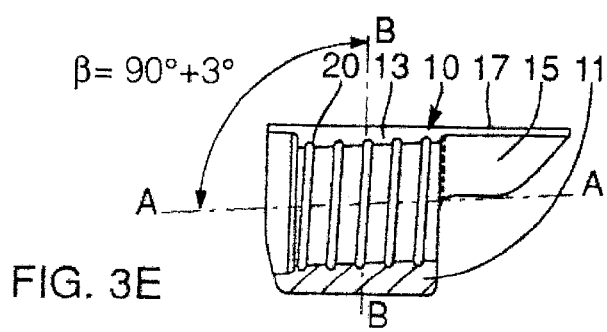

FIGS. 3D and 3E show downward inclinations of the pedal body. In FIG. 3D, the angle β corresponds to 90°−1.5° and in FIG. 3E, this angle corresponds to 90°−3.0°.

Thanks to the support set given by way of non-limiting example, there is thus obtained a range of adjustment of angular position corresponding to 6°. It is of course possible to have a different angular interval, for example 1° and/or a different number of support members constituting this set.

The pedal is provided with a set identical to that described above, or different from the latter, and to facilitate the identification of the supports of different angle, the support members are preferably provided with different colors, but they can also bear a direct indication of the angle β obtained by the support member in question.

To lighten in weight the pedal body 1, the latter can preferably be of carbon. In this case, it is preferably provided with wear members in the locations adapted to come into contact with a hooking member in the form of a cleat fixed below the cyclist's shoe.

FIG. 1 shows such a pedal provided with a first wear member 22 in the form of a plate, for example of polycarbonate, adapted to be encased in a recess 23 on the upper surface of the pedal body. This plate can be glued or made of a material with an adhesive surface so as to be detachable to be easily replaced after wearing.

FIG. 1 also shows a second wear member 24 in the form of a nose encased on the inner surface of the front engagement member 2. This nose is preferably a polyamide.

Thanks to the invention there is thus obtained a pedal permitting easy adjustment of the transverse and angular positions of the body of the pedal, and this with the help of extremely simple, reliable and inexpensive means.

What is claimed is:

1. Automatic cycle pedal comprising a pedal body (1) carrying engagement members (2, 3) for a hooking member fixed below the shoe of a cyclist, as well as a casing (7) containing a pedal axle (8) adapted to be fixed to a pedal crank, the casing (7) being connected to the pedal body (1) by a support member (10) fixed to the latter and comprising adjustment means (10, 12, 20, 21) of the transverse position and the angular position of the pedal body (1) relative to the pedal axle (8), characterized by the fact that to adjust said angular position, said adjustment means (10, 12, 20, 21) comprise a set of interchangeable support members (10) each defining a predetermined different angular position (β) from one support member to the next.

2. Pedal according to claim 1, characterized by the fact that said angular position changes according to an increasing or decreasing order of a value of 1 to 2 degrees from one support member (10) to the next.

3. Pedal according to claim 2, characterized by the fact that said value is substantially 1.5 degrees.

4. Pedal according to claim 1, characterized by the fact that the interchangeable support members (10) are four to six in number.

5. Pedal according to claim 1, in which said support member (10) comprises an elongated seat (12) receiving said casing (7) of the pedal axle (8), characterized by the fact that said seat (12) is provided with a tapping (21) adapted to coact with a screw thread (20) on said casing (7) to permit the continuous adjustment of the transverse position of the latter.

6. Pedal according to claim 1, characterized by the fact that said support member (10) is resiliently deformable and comprises a socket (11) containing said seat (7), this socket being slotted over all its length and comprising on opposite sides of the slot (13) a securement wing (14, 15) provided with a bearing surface (16, 17) against the pedal body (10), the bearing surface (16) of one (14) of the wings forming, when at least one securement wing (14, 15) of the support member is detached, an angle (α) slightly greater than 180° relative to the bearing surface (17) of the other securement wing (15), to permit the gripping and ungripping of said casing (7) in the socket (11) by resilient deformation of the latter during the securement of the support member (10) on the pedal body (1).

7. Pedal according to claim 1, characterized by the fact that the pedal body (1) is of carbon and is provided with at least one wear member (22, 24) adapted to come into contact with said hooking member of said shoe on the pedal.

8. Pedal according to claim 7, characterized by the fact that said at least one wear member comprises a plate (22) sunk into the upper surface of the pedal body.

9. Pedal according to claim 7, characterized by the fact that said at least one wear member (22) is detachable.

10. Pedal according to claim 7, characterized by the fact that a second wear member (24) is provided in the form of a nose sunk into an internal surface of a front engagement member (2).

11. Pedal according to claim 8, characterized by the fact that said at least one wear member (22) is detachable.

* * * * *